Aug. 22, 1961  C. S. STULTZ  2,997,291
SHOCK ABSORBER
Filed Feb. 18, 1959

INVENTOR.
Charles S. Stultz
BY
D. C. Staley
His Attorney

United States Patent Office 2,997,291
Patented Aug. 22, 1961

2,997,291
SHOCK ABSORBER
Charles S. Stultz, Dayton, Ohio, assignor to General Motors Corporation, Detroit, Mich., a corporation of Delaware
Filed Feb. 18, 1959, Ser. No. 794,111
6 Claims. (Cl. 267—64)

This invention relates to hydraulic shock absorbers particularly of the type having a piston reciprocable in a cylinder to displace fluid against flow resistance to absorb or dampen road shocks. Such shock absorbers incorporate a reservoir for hydraulic fluid that provides a space in communication with the shock absorber cylinder that can receive hydraulic fluid displaced from the cylinder, and from which the displaced fluid can return into the shock absorber cylinder.

In the conventional type of hydraulic shock absorber, a piston is carried on the end of a reciprocating rod that extends from the shock absorber cylinder and is connected to one part of a movable mass, such as the chassis of a motor vehicle. The piston reciprocates in the cylinder which is in flow connection with a reservoir for hydraulic fluid displaced from the cylinder, the cylinder and reservoir structure usually being connected to another movable mass, such as the running gear of a motor vehicle.

The reservoir of the shock absorber serves two purposes, one of which is provided a supply of hydraulic fluid to the shock absorber cylinder to make up for any loss of fluid that seeps to the outside of the shock absorber. The other function is that of providing a space into which fluid can be displaced from the shock absorber cylinder during the reciprocating motion of the piston within the cylinder of the shock absorber.

In a conventional direct-acting type shock absorber a volume of fluid equal to the displacement of the rod on which the piston is mounted is displaced from the shock absorber cylinder through suitable resistance valves in the piston and in the base of cylinder into the reservoir during the compression stroke of the shock absorber. On the rebound stroke, the volume of fluid that was displaced from the shock absorber cylinder during the compression stroke is returned to the shock absorber cylinder through a low resistance valve to refill the cylinder. To provide space for the pulsing action of the hydraulic fluid between the shock absorber cylinder and the reservoir, a volume of air has been retained in the reservoir so that the reservoir causes a high degree of turbulence of the fluid in the draulic fluid. However, this pulsing flow of hydraulic fluid between the shock absorber cylinder and the reservoir causes a high degree of turbulence of the fluid in the reservoir with the result the hydraulic fluid picks up air in the reservoir and becomes aerated to such an extent as to cause disturbing lag in the liquid flow through the resistance valving at the instant of reversal of movement of the shock absorber piston.

To reduce this aeration effect in the hydraulic fluid, the prior art has proposed the use of baffles in the reservoir to reduce fluid turbulence and thereby minimize absorption of the air in the oil. It has also been proposed in the prior art to provide deformable gas chambers or cells within the shock absorber to retain the hydraulic fluid within the shock absorber under pressure, with the shock absorber being completely filled with hydraulic fluid with the exception of closed gas chamber or cell. However, these prior art devices do not recognize a problem of loss of hydraulic fluid from the shock absorber that occurs over a period of operating time as a result of seepage of the hydraulic fluid along the reciprocating rod that extends into the shock absorber.

Since the normal shock absorber is used in conjunction with a spring of some kind between the chassis and running gear of a motor vehicle, the spring will establish a predetermined static position of the chassis relative to the running gear. This will result in the piston of the shock absorber being disposed in a predetermined position in the cylinder of the shock absorber when the vehicle is in a static condition. Loss of hydraulic fluid from the shock absorber will, therefore, result in air entering the reservoir of the shock absorber to offset the liquid loss. When a shock absorber containing a gas chamber as hereinbefore mentioned, loses hydraulic fluid, the space pocket formed as a result of the liquid loss will fill with air drawn into the shock absorber through the rod seal thus permitting aeration of the oil.

It is, therefore, an object of this invention to provide a hydraulic shock absorber wherein the device is completely filled with oil with the exception of a deformable gas chamber in the reservoir of the shock absorber and wherein the gas volume in the gas chamber is increased during normal operation of the shock absorber to compensate for normal loss of hydraulic fluid from the shock absorber, the increased volume of gas in the gas chamber being such as will maintain the reservoir and the cylinder completely filled with hydraulic fluid to the exclusion of gas pockets under all normal operating conditions at various ambient temperatures even though a normal loss of hydraulic fluid has occurred during operation of the shock absorber.

Another object of the invention is to provide a hydraulic shock absorber having the advantages of the foregoing object wherein the increase of gas volume in the gas chamber of the shock absorber is substantially equivalent to the loss of hydraulic fluid from the shock absorber to maintain thereby internal operating pressures of the shock absorber at substantially uniform levels during the life of the shock absorber.

It is another object of the invention to provide a hydraulic shock absorber having the advantages of the foregoing objects wherein at least a part of the gaseous or vaporous substances evolved from the hydraulic fluid in the shock absorber are diffused into the gas chamber to supplement the selected gas originally charged into the chamber whereby to compensate for loss of hydraulic fluid from the shock absorber and maintain working pressures within the shock absorber relatively uniform during the life of the shock absorber under all operating conditions.

It is another object of the invention to obtain the results of the foregoing objects in a hydraulic shock absorber by having a wall of the gas chamber or cell formed of a material having properties of impermeability to the hydraulic fluid in the shock absorber and to a selected gas placed in the gas chamber or cell and of permeability to gaseous or vaporous substances evolved from the hydraulic fluid during operation of the shock absorber, at least a part of the evolved gases passing into the gas chamber or cell to supplement the precharged volume of the selected gas to compensate for loss of hydraulic fluid from the shock absorber, the evolution of the gaseous substances from the hydraulic fluid being such that their diffusion into the gas chamber or cell increases the total volume of gas in the cell in substantially the same displaced volume that hydraulic fluid is lost from the shock absorber in normal operation.

It is another object of the invention to accomplish the results of the foregoing objects by forming a wall of the deformable gas chamber or cell of a semipermeable material that is impermeable to the hydraulic fluid in the shock absorber and to heavy molecular gases selected for retention in the gas chamber or cell but is permeable to gaseous substances evolved from the hydraulic fluid of lighter molecular structure than the gas retained in the gas chamber or cell.

Further objects and advantages of the present invention will be apparent from the following description, reference being had to the accompanying drawings wherein preferred embodiments of the present invention are clearly shown.

Figures 1, 2:
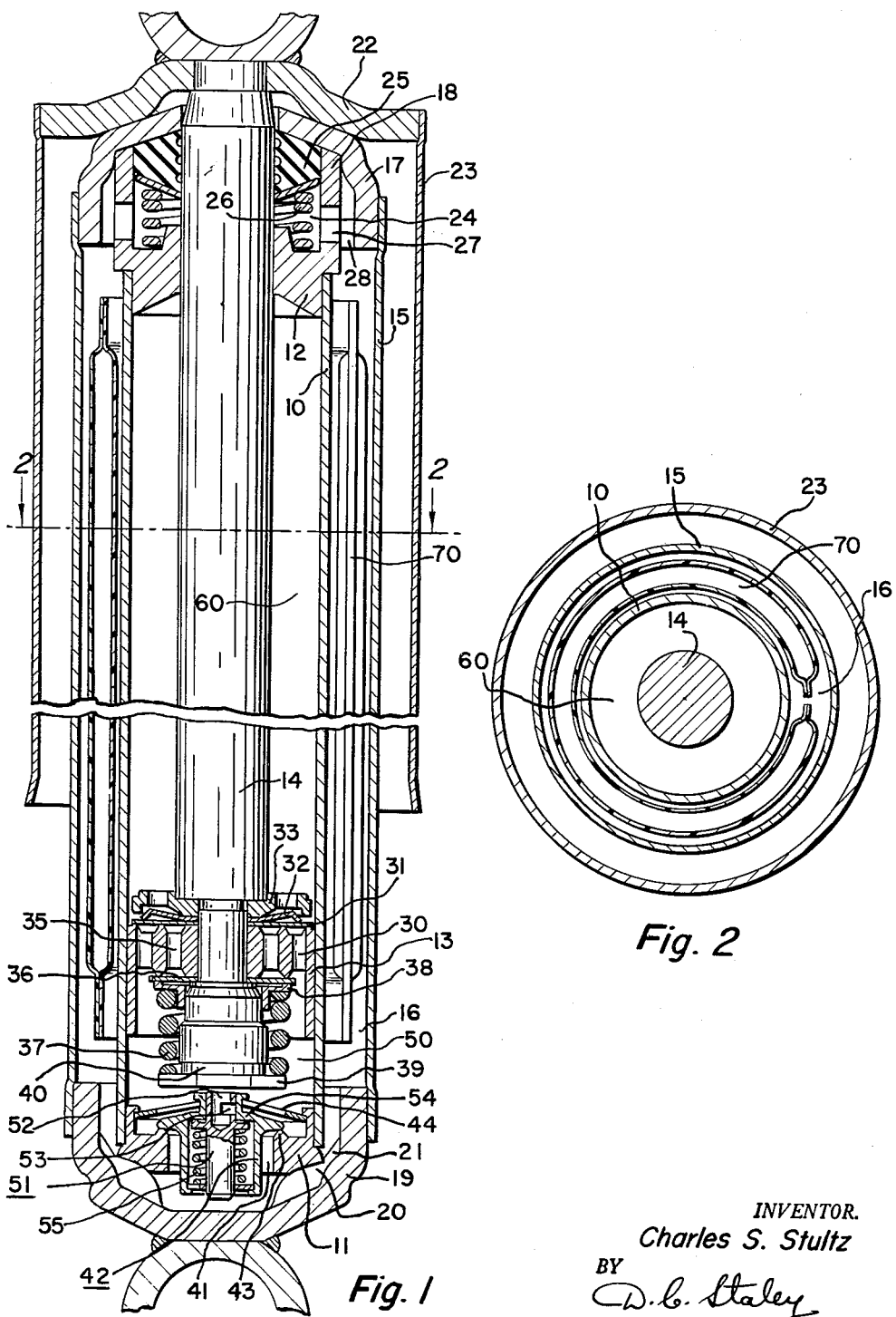
FIGURE 1 is a cross-sectional view of a shock absorber having a gas containing cell incorporating features of this invention.
FIGURE 2 is a cross-sectional view taken along line 2—2 of FIGURE 1.

In this invention the shock absorber consists of a cylinder 10 closed at one end thereof by a closure member 11 and at the opposite end by means of a rod guide member 12. The cylinder 10 receives a piston 13 carried on the end of a rod 14 that extends from the end of the shock absorber through the rod guide member 12.

A cylindrical tube 15 surrounds the cylinder 10 with the space 16 forming a reservoir for hydraulic fluid. The upper end of the tube 15 has secured thereto an end cap 17 against which the upper end 18 of the rod guide 12 rests. The opposite end of the tube 15 has an end cap 19 closing the lower end of the tube 15 on which the closure member 11 of the shock absorber cylinder 10 rests, a plurality of ribs 20 being provided on the inner side of the cap 19 to position the member 11 in spaced relationship to the end cap 19 and provide passages 21.

The rod 14 extends through the end cap 17 and carries a member 22 that, in turn, supports a dirt shield 23.

The rod guide 12 has a chamber 24 receiving a resilient rod seal member 25 held under compression by means of the compression spring 26. The seal chamber 24 is connected with the reservoir chamber 16 through the opening 27 in the rod guide 12 and one or more passages 28 between the end cap 17 and the rod guide 12.

The upper end of the rod 14 is connected with the chassis of a vehicle while the end cap 19 carries a suitable fitting for attachment to the running gear.

Piston 13 has an annular arrangement of axially extending passages 30 extending through the piston that are closed at their upper ends by means of a disk valve 31 held on seats provided around each of the passages by means of a spring 32, a retainer disk 33 controlling the maximum degree of flexure of the valve member 31. Piston 13 has a second series of annularly arranged passages 35 that extend through the piston which are closed by a poppet valve 36 held on seats around the passages 35 by means of the compression spring 37 disposed between the retainer 38 and the head 39 of a retaining nut 40 by which the piston and valve assembly are held in assembled relationship.

The closure member 11 at the lower end of the cylinder 10 has a central opening 41 that receives the valve member 42 held on an annular seat 43 by means of a finger spring 44. The spring 44 is very light and has little resistance to upward opening of the valve 42 from its seat 43 whereby to provide for relatively free flow of hydraulic fluid from the reservoir chamber 16 into the chamber 50 between the piston 13 and the valve 42.

The valve 42 carries a resistance valve 51 that has an axial passage 52 connected with the radial passage 53 in the reduced diameter end thereof, the valve 51 being held on the seat 54 by the compression spring 55. The resistance valve 51 is retained on its seat by a pressure somewhat greater than the pressure required in the chamber 50 to open valve 31 to insure positive flow of hydraulic fluid from chamber 50 into chamber 60 during the compression stroke of the shock absorber.

In the normal operation of the shock absorber thus far described, movement of piston 13 downwardly toward the base valve 42 in the compression stroke causes hydraulic fluid to be displaced from the chamber 50 into the chamber 60 through valve 31, resistance valve 51 opening only after pressure in chamber 50 exceeds the opening pressure of valve 31. Valve 51 will open to provide for displacement of hydraulic fluid from chamber 50 into the reservoir chamber 16 because of the entry of rod 14 into chamber 60, the volume of fluid displaced from chamber 50 being equal to the volume of the rod 14 entering the chamber 60. This displacement of fluid through valve 51 and restrictive flow through valve 31 controls the compression stroke of the shock absorber.

On the rebound stroke, that is on upward movement of piston 13, hydraulic fluid will be displaced from chamber 60 into chamber 50. However, the volume of fluid thus displaced through valve 36 will be insufficient to fill the total volume of chamber 50. "Make up" of hydraulic fluid will be received from the reservoir chamber 16 through passage 21, which flow of hydraulic fluid opens valve 42 against substantially no resistance and allows relatively free flow of the hydraulic fluid from the reservoir chamber into chamber 50.

In the normal shock absorber, since there is the displacement of hydraulic fluid aforementioned, it is necessary for an air space to be provided in the reservoir chamber 16. The constant pulsing of the displaced fluid into and out of the reservoir chamber creates high turbulence of the hydraulic fluid in the reservoir chamber resulting in absorption of air into the hydraulic fluid, thereby aerating the hydraulic fluid. Since resistance to flow through the valved passages of the shock absorber is different for aerated hydraulic liquid than for a solid body of liquid, the damping effect of the shock absorber using an aerated hydraulic fluid is different from the damping effect of a shock absorber using a solid body of fluid.

Also, some of the air in the hydraulic fluid becomes separated from the oil in the cylinder, particularly at the instant of release of pressure on the hydraulic fluid on reversal of stroke, resulting in free air in the cylinder which produces a lag in the control effect of the oil passing through the several resistance valves.

In this invention a deformable chamber or cell 70 is placed within the reservoir chamber 16. This cell 70 is a closed or sealed cell containing a predetermined volume of a selected gas. The volume of the selected gas in the sealed cell 70 is such that under conditions of full collapse of the shock absorber (full compression stroke) at the highest temperature expected in normal operation, the cell 70 will not be fully collapsed, thus there will always be a gas volume in the reservoir chamber 16 to accommodate liquid displaced from the shock absorber cylinder 10.

With the shock absorber cylinder 10 and the reservoir 16 and all passages and chambers connected therewith being completely filled with a hydraulic fluid, the gas volume in the cell 70 is also such that when the shock absorber is fully extended at the lowest temperature at which it normally operates, the expansion of the gas in the cell 70 will still maintain some pressure on the hydraulic fluid to insure filling of all voids in the shock absorber.

Thus, with the gas in the reservoir chamber 16 completely isolated from the hydraulic fluid, there will be no absorption of the gas into the hydraulic fluid and aeration of the hydraulic fluid is eliminated.

Also, the air cell or chamber 70 will automatically provide for normal expansion and contraction of the hydraulic fluid and the gas during operation of the shock absorber in various ambient temperatures to maintain the body of the hydraulic fluid constantly under pressure in the shock absorber to fill all voids.

However, it has been determined that while absolute isolation of the gas in the reservoir of the shock absorber from the hydraulic fluid will and does prevent aeration of the hydraulic fluid, and tends to maintain the hydraulic fluid under pressure at all times, yet the mere fact that a predetermined volume of gas is provided in the gas cell or chamber 70 at the time of assembly of the shock absorber will not insure maintenance of pressure on the hydraulic fluid after the shock absorber has gone into service. This is for the reason that during normal operation of any shock absorber, reciprocation of the rod 14 through the seal 25 produces a slow migration of hydraulic fluid from within the shock absorber to the exterior thereof. That is, over a period of time, hydraulic fluid is lost from the interior of the shock absorber so that after a period of working time the interior of the shock absorber will be less than completely full when the shock absorber is fully extended. When this occurs, the pressure in the void thus created becomes less than atmosphere with the result that air will migrate into the interior of the shock absorber and be absorbed into the oil. The constant pumping action of the void in drawing of air into the shock absorber on operation of the same results in aeration of the hydraulic fluid.

While it might appear possible to place a gas in the cell 70 in sufficient volume as to create a sufficiently high pressure in the cell that expansion of the cell as a result of the high pressure would keep the hydraulic fluid under pressure at all times during its normal service life, regardless of loss of hydraulic fluid, yet this is not the answer to the problem because high pressure in the cell 70 produces a resistance to compression on movement of the piston 13 on compression stroke to an extent of causing a hard ride effect in the vehicle. On the other hand, such high pressure in the gas chamber reduces the damping effect on rebound stroke. This also produces a pressurizing of the seal, which adds to leakage problems, increases friction on the seal and reduces seal life.

To give the most satisfactory ride condition in the vehicle it has been determined that the pressure in the cell 70 shall be substantially atmospheric pressure at normal ambient temperature with the shock absorber fully extended and completely full of hydraulic fluid. Thus, when the shock absorber is placed on a vehicle in a spring system, the normal displacement of hydraulic fluid from chamber 50 into the reservoir by entry of the rod 14 to place the piston 13 in a normal static position will be a volume of hydraulic fluid equal to the volume of the rod that has entered the chamber 60. In a shock absorber having a one inch internal diameter with a rod having a one-half inch external diameter, it will be apparent that the volume of fluid displaced into the reservoir 16 will be relatively small. Under these conditions a pressure of approximately 5 p.s.i. to 8 p.s.i. exists in the gas cell 70, with the pressure increasing to approximately 15 p.s.i. to 20 p.s.i. when the shock absorber is fully collapsed. The gas cell carries a charge of gas of 60 cc. to 70 cc.

In this invention the gas cell or chamber 70 is caused to expand or grow over the life of the shock absorber in a manner that the growth or expansion of the cell will compensate for loss of hydraulic fluid from the shock absorber so that, at all times during the life of the shock absorber, when the device is fully extended, the hydraulic fluid will be maintained under sufficient pressure, with the pressure in the gas cell 70 remaining not substantially above atmospheric pressure, to insure filling of all voids in the shock absorber with hydraulic fluid.

For example, the gas cell 70 is constructed of a nylon sheet film (a superpolyamid plastic) having a thickness of from two to four mils. The cell 70 is formed by placing two substantially rectangular sheets of nylon sheet film face to face and sealing all four edges of the film thereby forming a double-walled gas chamber as shown in FIGURE 2. A suitable gas, such as "Freon 13" (trifluoromonochloromethane), to which the nylon film is impermeable is charged into the gas cell in predetermined volume of 60 cc. to 70 cc. The charge of gas is sufficient to dispose opposite walls of the gas cell 70 in spaced relationship when the cell is at room temperature and under atmospheric pressure, the internal gas pressure in the cell just balancing atmospheric pressure. Also, the volume of gas charged into the cell 70 is sufficient to prevent complete collapse of the gas cell when the shock absorber is fully compressed at a temperature of from −35° F. to −40° F. This is to insure maintenance of a pressure on the hydraulic fluid under the lowest operating temperatures at which the shock absorber is expected to perform satisfactorily, the gas remaining in a gaseous state at all times.

Since the purpose of placement of the gas cell 70 in the reservoir of the shock absorber is to eliminate a lag in the control of the shock absorber at the instant of reversal of stroke, which normally results because of air inclusion in the hydraulic fluid, it will be apparent that the expansion of the gas cell 70 compensating for the loss of hydraulic fluid from the shock absorber will insure constituent operation of the shock absorber over its normal life.

In this invention the shock absorber is filled with a hydraulic fluid with the device fully extended and with the gas cell 70 in place in the reservoir 16, as shown in FIGURE 1, to completely fill all voids in the shock absorber with hydraulic fluid and thereby eliminate inclusion of any air pocket within the shock absorber. The hydraulic fluid filling the shock absorber is a petroleum base oil having a viscosity somewhat lighter than an SAE #5 oil. Such petroleum base oil normally contains a slight amount of moisture as well as a slight amount of air in solution. Also, these oils include certain traces of low boiling hydrocarbon fractions that are not completely eliminated in the distillation processes. The amount of moisture and air and low boiling hydrocarbon fractions in the oil are normally retained in solution in the oil at room temperature under atmospheric pressure so that the oils are quite stable.

However, these small volumes or traces or moisture and air and low boiling hydrocarbon fractions become effective in this invention to supplement the selected gas charged into the gas cell 70 during the course of operation of the shock absorber to cause the volume of the gas to be increased within the cell 70 to compensate for loss of hydraulic fluid from the interior of the shock absorber through the rod seal 25.

It has been discovered that during the operation of a shock absorber, the small amount of moisture and air normally held in solution in the hydraulic fluid is caused to be evolved or distilled from the oil in the shock absorber, probably due to a high degree of localized friction, heat and pressure resulting from the passage of the oil through the resistance valves of the shock absorber. It has also been discovered that the operation of the shock absorber causes some of the low boiling hydrocarbon fractions to be evolved from the shock absorber oil, apparently by distillation or some form of cracking process resulting from the mechanical working of the oil in the shock absorber by its passage through the resistance valves probably under a high degree of localized friction, heat and pressure.

The gaseous substances evolved from the hydraulic fluid in the shock absorber have previously exhibited no harmful effects in the shock absorber, other than inclusion in the aeration of the oil, probably because the rod seal of the shock absorber has been connected with the air space in the reservoir of the shock absorber with the result that the gases evolved from the shock absorber have leaked past the rod seal when pressure increased in the air filled portion of the reservoir chamber, thereby avoiding any substantial increase of gas pressure internally of the shock absorber.

However, in this invention, with the shock absorber being completely filled with oil, the rod seal is now liquid sealed, making it extremely difficult for leakage of gas from the shock absorber. The normal expectation would therefore be that pressure in the shock absorber would rise abnormally. But extended life tests showed this did not happen.

This led to the discovery that the volume of the gas in the cell 70 increased over a period of operating time demonstrating the fact that at least a part of the gaseous or vaporous substances evolved from the shock absorber oil were diffusing into the gas cell 70 with the result of supplementing the volume of the selected gas initially charged into the gas cell to expand the cell. Apparently, the nylon film forming the walls of the gas cell 70 acts like an osmotic film in that the hydraulic fluid in the shock absorber and the selected gas initially charged into the gas cell do not diffuse through the film forming the cell, that is, the cell wall is impermeable to the oil and to the selected gas, "Freon 13," but the cell wall is permeable to the gaseous or vaporous substances evolved from the oil, at least some of the gases diffusing into the gas cell to supplement the precharged volume of gas.

While the physical phenomena of the increase of the gas in the cell 70 has not been fully explained, yet it is known that at least some of the gas diffused into the cell 70 consists of low boiling hydrocarbon fractions of the petroleum base oil and since the nylon film is not impervious to gases having low molecular weight and to water vapor, it is reasonable to assume that these gaseous substances are those which diffuse through the wall of the film.

It is known that gases having a high molecular weight, such as "Freon 13," are satisfactorily retained in a cell formed of nylon film. However, this may not be the complete reason for the retention of the "Freon" gas since it is also known that "Freon 13" is a relatively nonpolar gas and with the nylon film being neither highly polar nor nonpolar, the tendency would be for the nonpolar gas to be retained within the cell formed of nylon film.

On the other hand, it is known that air is highly polar so that dissolved air evolved from the oil would tend to diffuse through the nylon film until the partial pressure of the air internally of the gas cell would substantially equal the partial pressure of the air in the shock absorber oil. Also, the low boiling hydrocarbon fractions of the petroleum base oil are relatively polar so that they would tend to diffuse into the gas cell 70 for the same reason.

Regardless of the theory of performance, the fact remains, that during operation of the shock absorber gaseous substances are evolved from the hydraulic fluid and some of these gaseous substances migrate into the gas cell 70 to supplement the charged volume of gas in this cell to such an extent that the increased volume of the gas cell 70 keeps pace with the loss of oil from the shock absorber past the rod seal.

In the preferred form of the invention, the film forming the walls of the gas cell 70 are formed of a commercial nylon (superpolyamide) film known as "nylon #6" that is made by several different companies. Also, the commercial material known as "nylon #42" is satisfactory for use in forming the gas cell 70 as well as other film forming superpolyamids. The nonpolar "Freon" compositions such as "Freon 13" (trifluoromonochloromethane—boiling point $-114.7°$ F.), and "Freon 14" (tetrafluoromonochloromethane—boiling point $-198.4°$ F.) are satisfactory for use as the selected gases for charging the gas cell 70. Both of these "Freon" compositions have satisfactory low boiling points of below $-40°$ F. that they will remain gaseous under all conditions of normal operation of the shock absorber. "Freon 22" (difluoromonochloromethane—boiling point $-41°$ F.) is another of the gases that can be used.

A gas cell 70 constructed of a sheet film of "nylon #42" was charged with "Freon 13" and placed on life test at 300° F. to 325° F. After 750,000 cycles on a two inch stroke, the cell volume increased 11 cc.

While nylon film has been specifically set forth herein as that used in forming the gas cell 70, other sheet films having the property of imperviousness to the hydraulic fluid in the shock absorber and the selected gas charged into the cell and of perviousness to the gas or vapor evolved from the hydraulic fluid can be used satisfactorily. For example, a gas cell 70 formed of a "Mylar" film having a thickness of three mils with the edges secured by an adhesive was filled with "Freon 13" and under normal operation of the shock absorber displayed the increase in gas volume heretofore described. "Mylar" is a polyester film manufactured by E. I. du Pont de Nemours Co. derived from terephthalic acid and polyhydric alcohols, usually a glycol or a glycerine, the molecular structure of which has been oriented by suitable stretching of the film.

As another example, a gas cell 70 was constructed of a "Mylar" film coated with a vinyl chloride plastic and filled with a predetermined volume of "Freon 13." This gas cell, after a standard life test, displayed a volume increase of 8 cc. at the end of the test. A cell 70 made of a film of nylon #42 having a thickness of 4.5 mils was filled with a predetermined volume of "Freon 13" and at the end of a life test displayed an increase of volume of 11 cc. Life testing on all samples consisted of cycling the shock absorber on a two inch stroke from 750,000 to 1,000,000 cycles at a temperature of 300° F. to 320° F.

It will be understood that gases other than the fluorinated compositions can be used as the selected gas for charging of the gas cell 70, a film being selected for the cell wall that is impervious to the selected gas but which is pervious to the gases evolved from the shock absorber oil.

While the embodiments of the present invention as herein disclosed constitute a preferred form, it is to be understood that other forms might be adopted.

What is claimed is as follows:

1. A hydraulic shock absorber comprising; a cylinder structure and a piston structure relatively reciprocable for displacement of hydraulic fluid against flow resistance and including a reservoir structure in flow communication with said cylinder structure receiving fluid so displaced, means in said reservoir structure defining a deformable closed gas containing chamber containing a controlled volume of a selected gas and including a wall in surface contact on one side with said hydraulic fluid and on the opposite side with the gas in said gas chamber, said cylinder and reservoir structures containing hydraulic fluid filling all portions thereof except said gas chamber, said wall having characteristics of impermeability to said gas and to said hydraulic fluid and of permeability to gaseous substances evolved from said hydraulic fluid during operation of the shock absorber to supplement thereby the volume of the selected gas in said gas chamber.

2. A hydraulic shock absorber comprising; a cylinder structure and a piston structure relatively reciprocable for displacement of hydraulic fluid against flow resistance and including a reservoir structure in flow communication with said cylinder structure receiving fluid so displaced, means in said reservoir structure defining a deformable closed gas containing chamber containing a controlled volume of a selected gas and including a wall in surface contact on one side with said hydraulic fluid and on the opposite side with the gas in said gas chamber, said wall having characteristics of impermeability to fluid interflow between said hydraulic fluid and said selected gas and of permeability to gaseous substances evolved from said hydraulic fluid into said gas chamber to supplement thereby the volume of the selected gas in the said chamber at a rate of supplementation as to maintain working pressures internally of the shock absorber at substantially uniform levels under conditions of normal hydraulic fluid loss from the shock absorber.

3. A hydraulic shock absorber comprising; a cylinder structure and a piston structure relatively reciprocable for displacement of hydraulic fluid against flow resistance and including a reservoir structure in flow communication with said cylinder structure receiving fluid so displaced, and a sealed gas containing chamber in said reservoir structure containing a controlled volume of a selected gas and including a wall in surface contact on one side with said hydraulic fluid and on the opposite side with the gas in said gas chamber, said cylinder and reservoir structures containing hydraulic fluid filling all portions thereof except said gas chamber, said wall having characteristics of impermeability to said gas and to said hydraulic fluid and of permeability to gaseous substances evolved from said hydraulic fluid during operation of the shock absorber to supplement thereby the volume of the selected gas in said gas chamber.

4. A hydraulic shock absorber comprising; a cylinder structure and a piston structure relatively reciprocable for displacement of hydraulic fluid against flow resistance and including a reservoir structure in flow communication with said cylinder structure receiving fluid so displaced, and a sealed gas containing chamber formed of a deformable plastic film in said reservoir structure and containing a controlled volume of a selected gas, said plastic film having characteristics of impermeability to said gas and to said hydraulic fluid and of permeability to gaseous substances evolved from said hydraulic fluid during operation of the shock absorber to supplement thereby the volume of the selected gas in said gas chamber.

5. A hydraulic shock absorber compirsing; a cylinder structure and a piston structure relatively reciprocable for displacement of hydraulic fluid against flow resistance and including a reservoir structure in flow communication with said cylinder structure receiving fluid so displaced, and a sealed gas containing chamber formed of a deformable plastic film in said reservoir structure and containing a controlled volume of a selected gas, said plastic film having characteristics of impermeability to said gas and to said hydraulic fluid and of permeability to gaseous substances evolved from said hydraulic fluid during operation of the shock absorber to supplement the volume of the selected gas in said gas chamber and increase thereby the total size of the said gas chamber.

6. A hydraulic shock absorber having the structure set forth in claim 5 in which the increase in size of the said gas chamber compensates substantially for a volume of hydraulic fluid lost from the shock absorber in normal operation thereof.

References Cited in the file of this patent
UNITED STATES PATENTS

| | | |
|---|---|---|
| 2,298,938 | Griffin et al. | Oct. 13, 1942 |
| 2,371,705 | O'Connor | Mar. 20, 1945 |
| 2,571,279 | Myklestad | Oct. 16, 1951 |
| 2,635,715 | Riedel et al. | Apr. 21, 1953 |
| 2,808,904 | O'Connor et al. | Oct. 8, 1957 |
| 2,856,035 | Rohacs | Oct. 14, 1958 |